(12) United States Patent
Duffy et al.

(10) Patent No.: US 6,579,336 B1
(45) Date of Patent: Jun. 17, 2003

(54) REVERSED CUBE AIR FILTER ASSEMBLY

(75) Inventors: Bruce T. Duffy, Richmond, VA (US); John C. Stanley, Wyckoff, NJ (US)

(73) Assignee: Tri-Dim Filter Corporation, Louisa, VA (US)

( * ) Notice: Subject to any disclaimer, the term of this patent is extended or adjusted under 35 U.S.C. 154(b) by 0 days.

(21) Appl. No.: 09/594,489

(22) Filed: Jun. 16, 2000

(51) Int. Cl.⁷ .................... B01D 50/00; B01D 46/00
(52) U.S. Cl. .................... 55/490; 55/501; 55/511; 55/529; 55/DIG. 31; 55/DIG. 35; 55/492
(58) Field of Search .................... 55/490, 501, 511, 55/529, DIG. 31, DIG. 35, 492

(56) References Cited

U.S. PATENT DOCUMENTS

| | | | |
|---|---|---|---|
| 1,694,089 A | * 12/1928 | Wright | 55/529 |
| 2,964,127 A | 12/1960 | Korn | |
| 3,026,967 A | 3/1962 | Stevens et al. | |
| 3,080,695 A | 3/1963 | Hay | |
| 3,396,517 A | * 8/1968 | Schwab | 55/368 |
| 3,500,991 A | * 3/1970 | Vogt | 55/529 |
| 3,538,686 A | * 11/1970 | Schwab | 55/529 |
| 3,606,740 A | 9/1971 | Ballennie | |
| 3,653,189 A | * 4/1972 | Miyake et al. | 55/529 |
| 3,691,736 A | 9/1972 | Neumann | |
| 3,830,042 A | 8/1974 | MacDonnell | |
| 3,853,509 A | 12/1974 | Leliaert | |
| 3,907,214 A | 9/1975 | Dankel | |
| 4,632,680 A | 12/1986 | Klimezak | |
| 4,689,058 A | 8/1987 | Vogt et al. | |
| 4,769,052 A | 9/1988 | Kowalski | |
| 4,865,628 A | 9/1989 | Iwanczyk | |
| 5,279,631 A | 1/1994 | Pingel | |
| 5,453,049 A | 9/1995 | Tillman, Jr. et al. | |
| 5,493,160 A | 2/1996 | Botten | |
| 5,752,796 A | 5/1998 | Muka | |
| 5,776,218 A | * 7/1998 | Enns | 55/DIG. 31 |
| 5,837,040 A | 11/1998 | Caughron et al. | |
| 5,840,091 A | 11/1998 | Strong | |
| 5,849,053 A | 12/1998 | Napadow et al. | |
| 5,958,096 A | * 9/1999 | Yee et al. | 55/529 |
| 5,972,059 A | * 10/1999 | Morgan | 55/529 |

OTHER PUBLICATIONS

Webster's Ninth New Collegiate Dictionary, 1991, Merriam–Webster Inc., p. 475.*

* cited by examiner

Primary Examiner—David A. Simmons
Assistant Examiner—Minh-Chau T. Pham
(74) Attorney, Agent, or Firm—John H. Thomas, PC

(57) ABSTRACT

A reversed cube air filter assembly has a frame and filter media. The frame is adapted to be attached to and surround an air intake duct wherein the duct has an intake side and the frame is adapted to protrude outwardly from the intake side. The filter media is adapted to be removably mounted around the frame.

3 Claims, 2 Drawing Sheets

REVERSED CUBE AIR FILTER ASSEMBLY

This invention relates to an air filtration assembly, specifically, a reversed cube filter assembly having a reusable frame that allows replacement filter media to be easily exchanged for dirty filter media.

BACKGROUND OF THE INVENTION

An air filter assembly is a device used for removing particulate material from an air stream. Simply stated, a filter assembly is made up of media through which the air passes, and a frame to hold the media in place. The media allows air to pass through while capturing and holding particulate material traveling in the air stream. A filter's ability to remove particulates is known as "efficiency", while the amount of particulate a filter can hold in its useful life period is known as "dust holding capacity". The amount of restriction to the air flow that is caused by the media is known as "resistance".

The simplest filter is a flat sheet of media. This filter has a certain face dimension and contains a certain amount of media that offers a certain efficiency, dust holding capacity and resistance. By increasing the surface area of media in that filter assembly (using the identical media) while allowing the filter to have the same face dimension, the efficiency of the filter would generally increase, the dust holding capacity would increase and the resistence would decrease. Conventional ways to add media to a given face dimension are to pleat the media or to allow the media to extend out of the back or downstream side of the filter assembly. When the media extends out the back of the filter assembly, this type of filter is typically known as a cube filter, or a single pocket filter.

When a conventional cube filter is used, the filter assembly requires enough space on its downstream side for the filter assembly to fit with no interference downstream. Sometimes, there is not enough space to use a cube. For instance, in some situations, second stage filters may be placed directly behind a first filter, or coils or some other mechanical device are located directly behind an initial filter. In still further cases there may not be any room on the downstream side to add additional filters.

One type of reversed cube assembly is also known. In these known assemblies, filter media is integrally, permanently reinforced with a support frame that allows the assembly to protrude from the upstream side of an intake duct whether it be a single unit for the duct or multiple units mounted in a filter rack for a larger system. The drawback with these existing assemblies is the cost, because the original and replacement filters include the integral frame and will be disposed along with the dirty filter media. The cost of the filter media/frame unit can be substantially higher than other filter media options available.

SUMMARY OF THE INVENTION

Accordingly, as an object of the present invention to overcome the foregoing drawbacks and provide a reversed cube filter assembly having a replaceable filter media so that air may be efficiently and inexpensively filtered through use of this reverse cube structure.

In one embodiment, a reversed cube air filter assembly includes a frame and a filter media adapted to be removably mounted around the frame. The frame is adapted to be attached to and surround an air intake duct wherein the duct has an intake side and the frame is adapted to protrude outwardly from the intake side. The frame may further include a hook and loop fastener (VELCRO®) which is adapted to removably attach to the filter media mounted around it. Also, the filter media may be a graduated density filter media.

In a further embodiment, a reversed cube air filter assembly has a filter rack system header, wherein the header has an intake side. Filter media is removably attached around the header, and frame means for maintaining the shape of the filter are attached to the header and protrude outwardly from the intake side of the header. The header may further include a hook and loop fastener (VELCRO®) so that the filtered media is removably attached to the header through the engagement of the hook and loop fastener (VELCRO®) and the filter media.

In a still further embodiment, a reversed cube air filter assembly includes a rectangular filter rack system header wherein the header has an intake side. A box-shaped wire frame having at least one side that is substantially the same shape as the header is attached to the header and protrudes outwardly from the intake side. Filter media is mounted around the frame and removably attached to the header.

BRIEF DESCRIPTION OF THE DRAWINGS

Various other features and attendant advantages of the present invention will be more fully appreciated as the same becomes better understood when considered in conjunction with the accompanying drawings, in which the like reference characters designate the same or similar parts throughout the several views, and wherein.

DETAILED DESCRIPTION OF THE PREFERRED EMBODIMENTS

Figure 1:
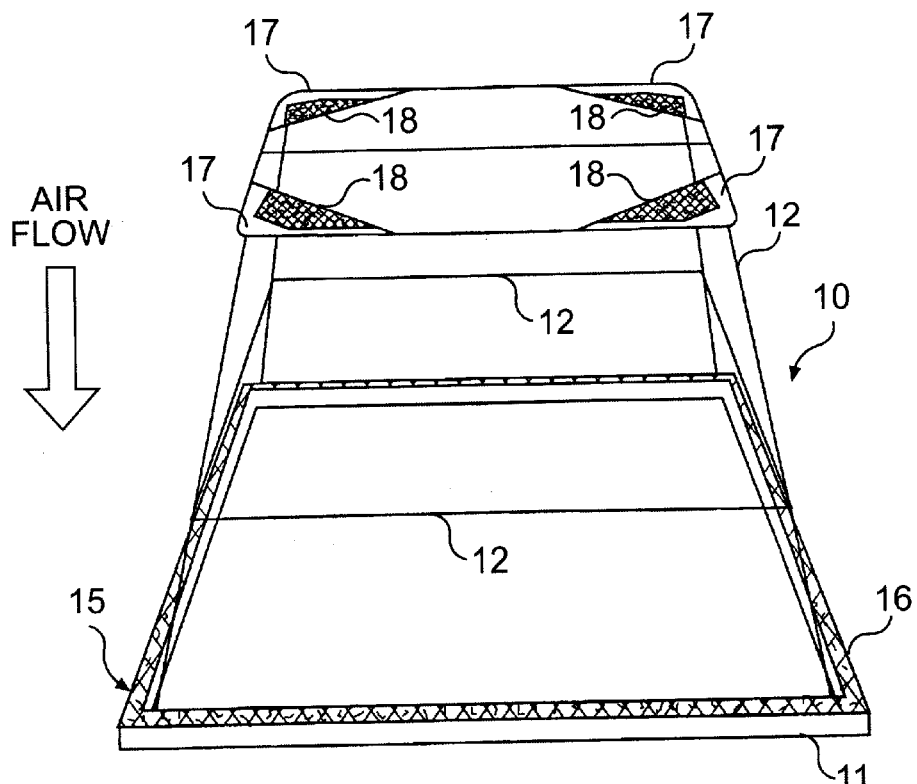
FIG. 1 is a perspective view of a reversed cube air filter frame in accordance with the present invention.

FIG. 1 illustrates an embodiment of the filter frame 10 which is made up of a header 11 and wire frame 12. The top side 15 of the header 11 as shown is the air intake side of the header. On that side of the header 11 is a strip of hook and loop fastener (VELCRO®) 16. The wire 12 is welded or otherwise attached to the header 11 to secure it thereto. At the top of the frame 12 there are corner supports 17 which are small metal sheets that have hook and loop fastener (VELCRO®) patches 18 attached thereto.

The header 11 is adapted to fit around an air intake duct in an air filtration assembly. As shown, the header 11 is substantially square. Obviously, the shape of the header can be rectangular or curved to fit the dimensions of an air intake duct. The shape of the wire frame 12 is generally box-like, or as it is commonly referred to, in the shape of a cube. The dimensions of this cube may be varied to fit the space limitations or requirements where the filter assembly will be installed. Similarly, the shape of the frame can be varied in accordance with various of the performance parameters required in a given application. These variations will be based on the efficiency, dust holding capacity and air flow resistence specifications for a given application.

The frame 12 is shown as a wire structure. The frame 12 may be made of other materials, for instance plastics, that accomplish the purposes of supporting filter media to prevent it from being sucked into an air intake duct and allowing air to pass through with minimal blockage. The actual pattern and structure of the frame 12 can be varied in accordance with use specifications. For instance, if air flow is very substantial, then additional wiring may be desirable to keep the filter media from deforming. Less flow may require a very simple frame structure. Also, a single frame 10 is shown. There may be multiple frames joined together to cover an intake duct. There may be multiple ducts covered by a single frame. There may be multiple frames mounted side-by-side on a bank of intake ducts.

In a still further embodiment that is implicit in FIG. 1, the header 11 may itself comprise a portion of the air intake duct. In that situation, the frame 12 would be attached directly to the air intake duct by welding or screws or other ways known to those skilled in the art. This may be an embodiment preferred with respect to retrofitting existing intake ducts with the present reversed cube assembly.

Figure 2:
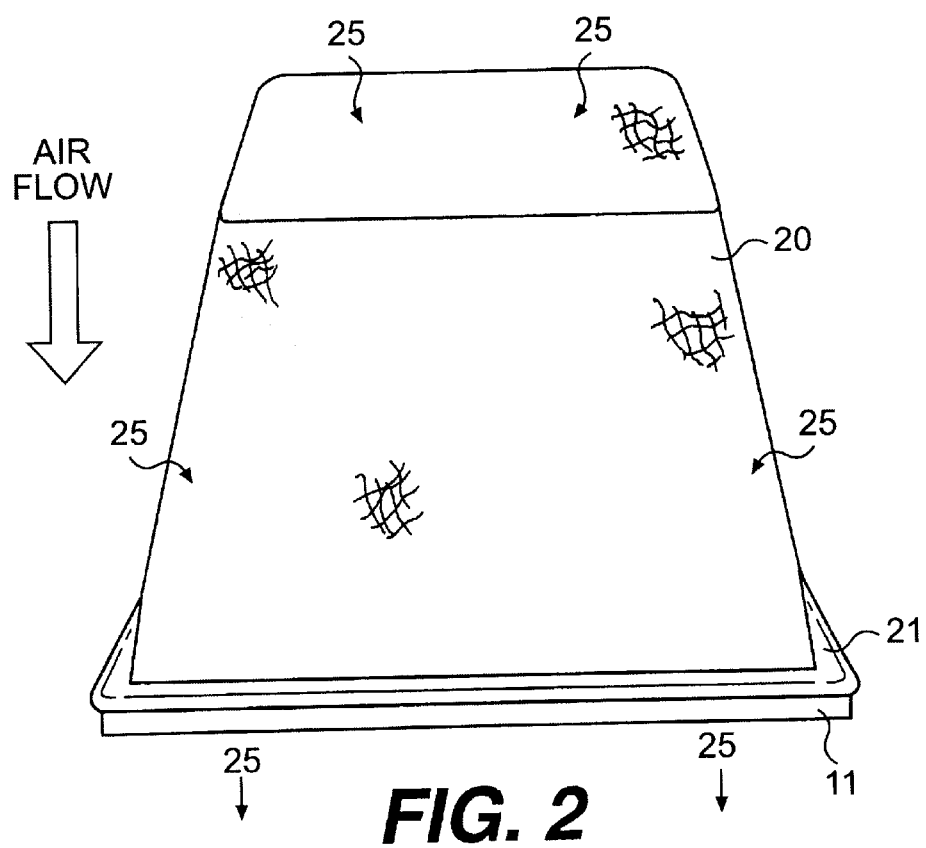
FIG. 2 is a perspective view of the reversed cube air filter assembly in accordance with the present invention.

FIG. 2 illustrates the same frame assembly (as shown in FIG. 1) as covered with filter media 20. The filter media 20 is selvedged around its edge 21. The selvedged edge is removably attached to the frame 11 through the engagement of the filter media with the hook and loop fastener (VELCRO®) 16. (Of course, other methods such as tacks and snaps may be used to removably attach media 20 to a frame 10). The air flow when this filter is in use is shown by the large arrow. It is also shown in small arrows 25 in that air will pass through the filter media out the bottom of the header 11. The filter media 20 can be any appropriate filter media known to those of skill in the art. In a preferred embodiment, the filter media is graduated density filtration media, for instance, sold under the trade name TRI-DEK™ available from TRI-DIM Filter Corporation.

Looking at FIGS. 1 and 2 together, it can be seen that the frame 12 holds the filter media 20 in the protruding position so that the filter protrudes outwardly from the intake side 15 of the header 11. The frame 12 holds the form of the otherwise malleable and deformable filter media 20. The actually geometry and design of the wire frame 12 may be varied. It is only necessary to hold the filter media in an extended position.

Figure 3:
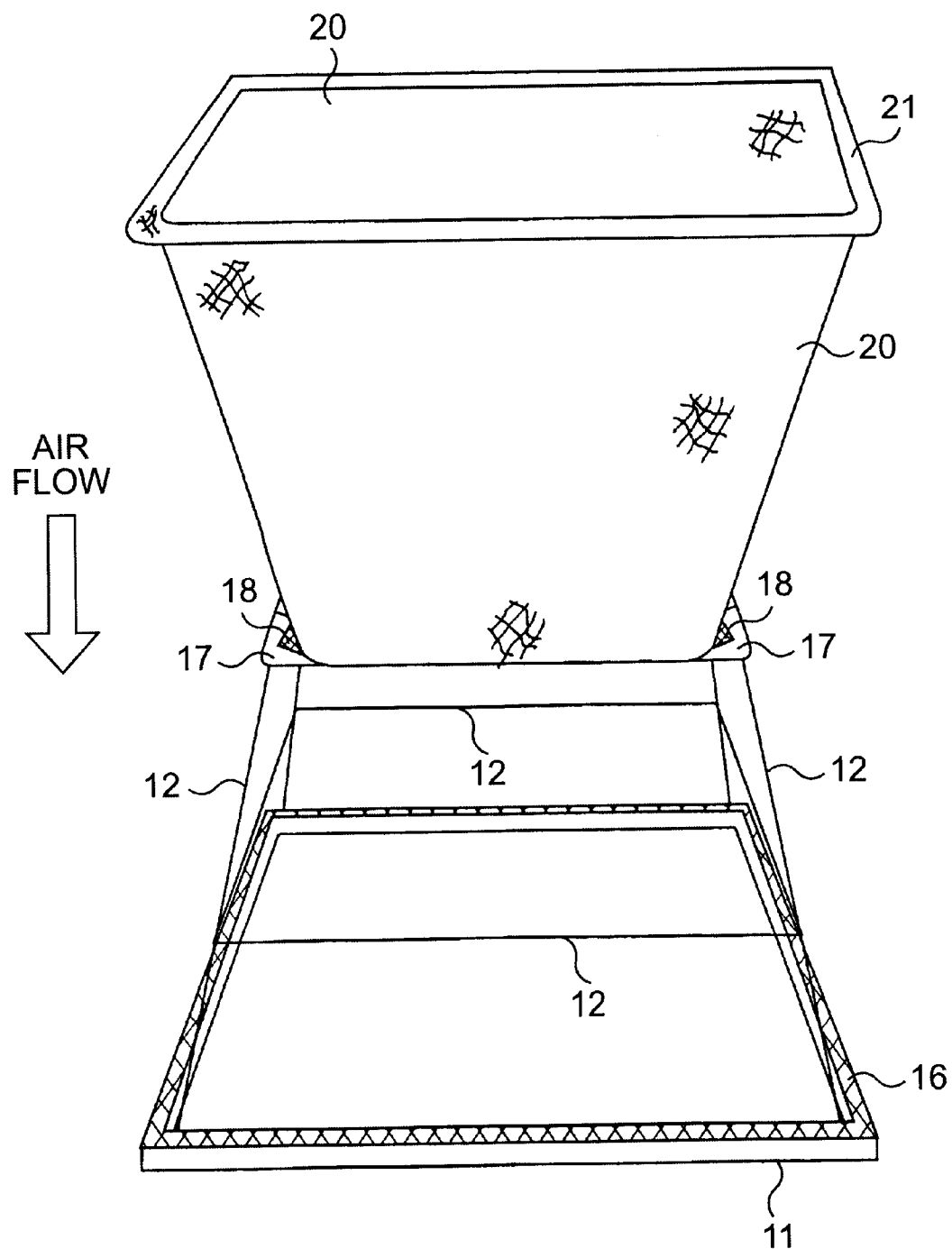
FIG. 3 is a perspective view of the filter assembly shown in FIG. 2 wherein the filter media has been inverted as it would be in the process of removing it from the frame.

FIG. 3 illustrates the same assembly as shown in FIGS. 1 and 2, except that the filter media 20 is shown in the inverted position and is attached to the frame 12 by an engagement of the hook and loop fastener (VELCRO®) patches 18 with the filter media 20. This is a useful feature, because by inverting the filter media 20 upon removal from the header 11, the loose dirt and other particulates that have accumulated in the filter will collect on the inside of the inverted cube of media as shown in FIG. 3. The hook and loop fastener (VELCRO®) patches 18 may alternatively be adhered to other portions of the frame 12. Other removable attachment methods such as tacks and snaps may be used. Also, the corner supports As demonstrated, the frame assembly 10 can be mounted a single time onto an air intake duct. Substitute filter media can then be replaced out as needed. This is much more economical than mounting an integrally framed filter assembly that would require replacement of essentially the entire assembly each time the filter media needs to be disposed of, reducing manufacturing costs and disposal costs.

While the invention has been described with reference to specific embodiments thereof, it will be understood that numerous variations, modifications and additional embodiments are possible, and accordingly, all such variations, modifications, and embodiments are to be regarded as being within the spirit and scope of the invention.

What is claimed is:

1. A reversed cube air filter assembly consisting essentially of:

a frame adapted to be attached to and surround an air intake duct wherein the duct has an intake side and the frame is adapted to protrude outwardly from the intake side, and filter media adapted to be removably mounted around the frame.

2. A reversed cube air filter assembly as described in claim 1, wherein the frame comprises a hook and loop fastener adapted to removably attach to the filter media.

3. A reversed cube air filter assembly as described in claim 1, wherein the filter media is a graduated density filter media.

* * * * *